United States Patent
Ylä-Jääski et al.

(10) Patent No.: US 7,103,374 B2
(45) Date of Patent: Sep. 5, 2006

(54) SYNCHRONIZATION OF TRANSMITTER AND RECEIVER FREQUENCIES IN MULTIACCESS NETWORKS

(75) Inventors: Antti Ylä-Jääski, Espoo (FI); Mika Grundström, Tampere (FI); Janne Aaltonen, Turku (FI)

(73) Assignee: Nokia Corporation, Espoo (FI)

( * ) Notice: Subject to any disclaimer, the term of this patent is extended or adjusted under 35 U.S.C. 154(b) by 247 days.

(21) Appl. No.: 10/190,143

(22) Filed: Jul. 3, 2002

(65) Prior Publication Data
US 2004/0005870 A1  Jan. 8, 2004

(51) Int. Cl.
*H04Q 7/20* (2006.01)
(52) U.S. Cl. ...................................... 455/502
(58) Field of Classification Search ................ 455/502, 455/503, 500, 426.1, 448, 454, 39, 552.1, 455/119, 524, 525, 265, 259; 370/335, 342, 370/441, 203; 375/354, 355, 356
See application file for complete search history.

(56) References Cited

U.S. PATENT DOCUMENTS

| | | | |
|---|---|---|---|
| 6,628,946 B1 * | 9/2003 | Wiberg et al. | 455/434 |
| 6,717,547 B1 * | 4/2004 | Spilker et al. | 342/464 |
| 6,741,836 B1 * | 5/2004 | Lee et al. | 455/502 |
| 6,775,519 B1 * | 8/2004 | Wiedeman et al. | 455/12.1 |
| 2002/0039396 A1 * | 4/2002 | Zalio | 375/355 |

\* cited by examiner

*Primary Examiner*—Eliseo Ramos-Feliciano
(74) *Attorney, Agent, or Firm*—Banner & Witcoff, Ltd.

(57) ABSTRACT

The present invention provides methods and apparatus for integrating the operation of a plurality of radio networks. The plurality of radio networks may utilize a common frequency spectrum. The radio center frequencies are adjusted so that frequency drift in relation to each radio network is reduced. Also, system information about the plurality of radio networks may be sent on a radio channel that is associated with one of the radio networks. An oscillator synchronizer synchronizes a first reference oscillator that is associated with a first radio network and a second reference oscillator that is associated with a second radio network in order to adjust radio center frequencies. With a variation of the embodiment, a reference oscillator of one of the radio network adjusts center frequencies for radios that are associated with the other radio network.

12 Claims, 8 Drawing Sheets

SYNCHRONIZATION OF TRANSMITTER AND RECEIVER FREQUENCIES IN MULTIACCESS NETWORKS

FIELD OF THE INVENTION

This invention relates generally to integrating wireless telephony systems with systems supporting digital broadband broadcasting.

BACKGROUND OF THE INVENTION

Different radio network systems that may offer different telecommunications services are typically deployed separately from each other. As an example, third generation (3G) wireless systems are being deployed in the 2 GHz International Mobile Telephony (IMT)-2000 frequency allocations in accordance with International Telecommunications Union (ITU) standards. Wideband code division multiple access (WCDMA) is an example of a third generation wireless technology. WCDMA has a number of variations, including direct spread with frequency division duplex (in which the uplink and the downlink are separated in frequency), direct spread with time division duplex (in which the uplink and the downlink are separated by time), and multiple carrier CDMA. Direct spread-frequency division duplex WCDMA typically utilizes a 5 MHz bandwidth or a multiple of a 5 MHz bandwidth. Third generation wireless systems may utilize technologies in accordance with different standards, including cdma2000. Cdma2000 is a variation of a multiple carrier CDMA technology and is compatible with second generation wireless systems that are operating in North America. Moreover, second generation (2G) wireless systems are operating around the world. In Europe, second generation wireless systems typically comply with global systems for communications (GSM) standards, which are based on a time division multiple access technology. In North America and Korea, second generation wireless systems are operating in accordance with cdmaOne, which is based on a code division multiple access technology.

FIG. 1 shows a system of base stations 101, 103, 105, 107, and 109 that support global system for mobile communications (GSM) that are synchronized by a global positioning system (GPS) reference system 111 in accordance with prior art. Base stations 101–109 service geographical areas 102, 104, 106, 108, and 110, respectively. Global positioning system (GPS) 111 provides a time reference 113 for base stations 101–109. Time reference 113 may be used to synchronize base stations 101–109 to a common time base and to adjust reference oscillators that control the center frequencies of radios that are associated with base stations 101–109. The time base may be used to establish the timing for a time division multiple access system (TDMA) structure. Frequency adjustment may be needed to correct drifting for the center frequencies that are associated with base stations 101–109, in which the frequency drifting may cause interference with geographical areas 102–110.

FIG. 2 shows a system of single frequency network (SFN) base stations 201 and 203 that are synchronized by global positioning system reference system 111 in accordance with prior art. Single frequency network base stations 201 and 203 may support a direct spread wideband code division technology, in which a plurality of wireless terminals is simultaneously utilizing the same frequency spectrum. Base stations 201 and 203 support geographical areas 202 and 204, respectively. Global positioning system 111 provides time reference 113 to synchronize transmissions from base stations 201 and 203. Time reference 113 may also be used to correct drifting of local oscillators that control the center frequencies of radios in base stations 201 and 203.

In parallel with the deployment of second and third generation wireless systems, digital video broadcasting (DVB) is being deployed in different parts of the world. Digital video broadcasting standards support the broadcast of digital television content as well as other digital information, e.g. Internet web content. Terrestrial digital video broadcasting (DVB-T), for example, may utilize very high frequency (VHF) or ultra high frequency (UHF) frequency bands with orthogonal frequency division multiplexing (OFDM) modulation, which is based on multi-carrier modulation. DVB-T is largely designed for unidirectional, broadcast, and multicast media delivery, in which the frequency bandwidth is sufficiently large to support data rates as much as 32 Mbps on the downlink (base station to wireless terminal). Other standards that are being adopted throughout the world are also applicable, including Integrated Services Digital Broadcasting-Terrestrial transmission (ISDB-T) and Digital Television (DTV).

FIG. 3 shows two different radio networks that are synchronized by different reference oscillators in accordance with prior art. A radio network 301 comprises a radio 307 and a reference oscillator 305. A radio network 303 comprises radios 311, 313, and 315 and a reference oscillator 309. Reference oscillator 305 adjusts a centegr frequency f1 for radio 307. Reference oscillator 309 adjusts center frequencies f2, f3, and f4 for radios 311, 313, and 315, respectively. Radio network 301 may support a wideband CDMA technology such as WCDMA, while radio network 303 may support a different radio technology and telecommunications service such as terrestrial digital video broadcasting. Typically, center frequency f1 is significantly removed from center frequencies f2, f3, and f4. (With WCDMA and DVB-T, as illustrated in the example above, radio network 301 may utilize frequency spectrum at approximately 2 GHz while radio network 303 may utilize a frequency spectrum in the UHF band, e.g. channel 40 that corresponds to approximately 626 MHz). Because of the disparity of center frequencies, radio network 301 and radio network 303 utilize separate reference oscillators.

As illustrated in example above, different radio networks are being deployed that are not integrated either from a service provider's or from a user's perspective. Different radio systems may utilize different center frequencies and different frequency bandwidths, while having different symmetry configurations. For example, a WCDMA system may be deployed in the 2 GHz spectrum, utilizing direct spread CDMA with approximately equivalent data rates on the uplink (wireless terminal to base station) and downlink (base station to wireless terminal), while a DVB-T system may be deployed in the UHF television frequency spectrum that utilizes OFDM modulation with a high data rate on the downlink. Moreover, in order to support both DVB-T and WCDMA, a wireless terminal requires two separate radio frequency (RF) front-ends. Thus, providing different telecommunications services to a user may be inefficient and complex.

Integrating different radio network systems may facilitate the support of different telecommunication services to a user. For example, cellular radio services are almost ubiquitous throughout the word. Moreover, broadband, multicast video services are being developed and may soon be widely deployed. Of course, a user wishes to have a single wireless terminal even though the user may subscribe to a plurality of telecommunication services that may be supported by different radio networks. Consequently, a method and apparatus that integrates associated radio networks are beneficial in advancing the art in support of these telecommunication services.

SUMMARY OF THE INVENTION

An aspect of the present invention provides methods and apparatus for integrating the operation of a plurality of radio networks. The plurality of radio networks may utilize common frequency spectrum. The center frequencies for radios in each of the radio networks are adjusted so that frequency drift in relation to each radio network is reduced. Also, system information about the plurality of radio networks may be sent on a radio channel that is associated with one of the radio networks.

In an exemplary embodiment of the invention, a wideband code division multiple access (WCDMA) radio network and a terrestrial digital video broadcast (DVB-T) radio network are integrated for operation in an IMT-2000 frequency spectrum (corresponding to approximately 2 GHz). The WCDMA radio network comprises at least one radio and a reference oscillator. The WCDMA radio network is coupled to a UMTS terrestrial radio access network (UT-RAN) that comprises a radio network controller. In the embodiment, an oscillator synchronizer synchronizes a first reference oscillator that is associated with the WCDMA radio network and a second reference oscillator that is associated with the DVB-T radio network in order to adjust radio center frequencies. System information about both radio networks is broadcasted to wireless terminals on a broadcast channel (BCCH) over a radio channel and may be supported by delivery of the system information within the UTRAN and the core network. Moreover, the embodiment supports integrated operation of both WCDMA and DVB-T services at a wireless terminal. With a variation of the embodiment, a reference oscillator at either the WCDMA radio network or the DVB-T radio network adjusts center frequencies for radios that are associated with the other radio network.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
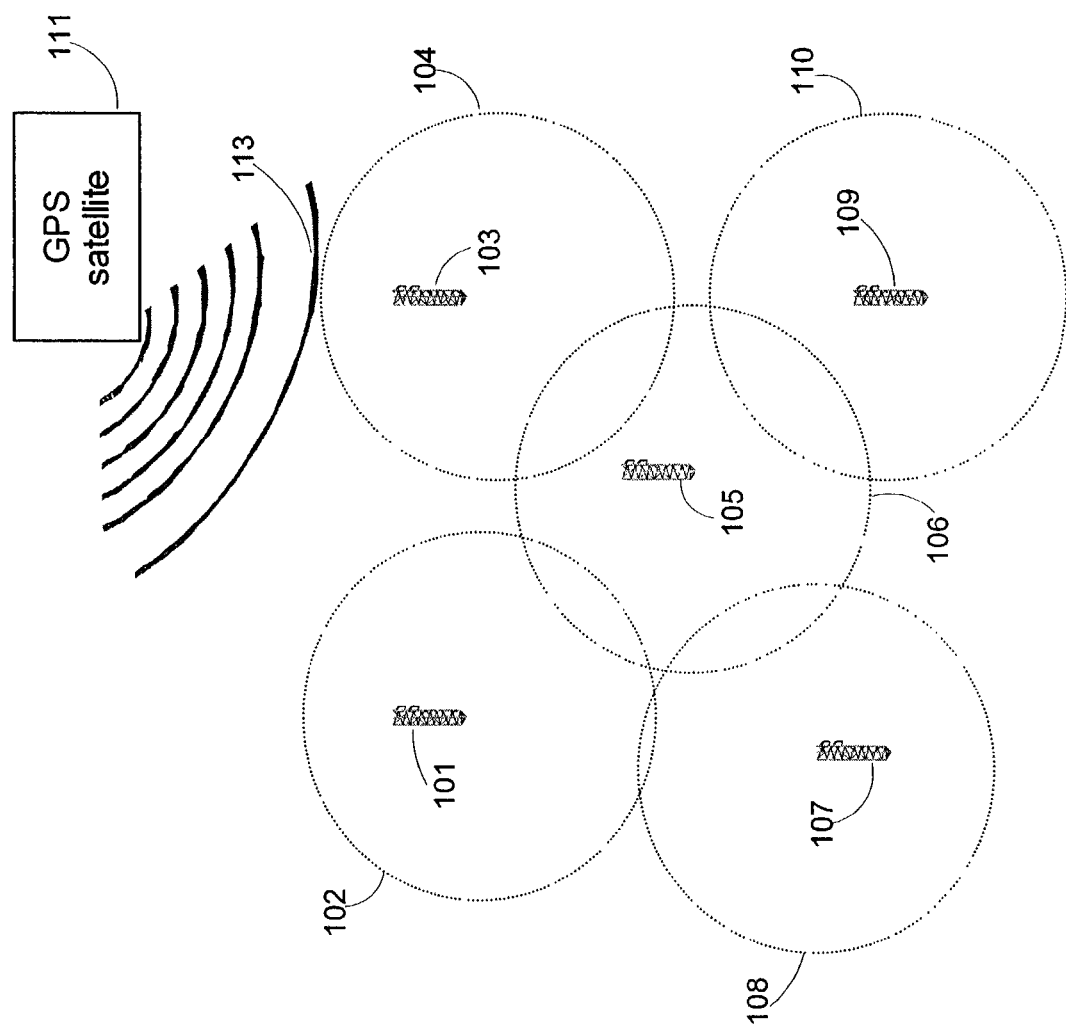
FIG. 1 shows a system of base stations that support global system for mobile communications (GSM) that are synchronized by a global positioning system (GPS) reference clock in accordance with prior art.
Figure 2:
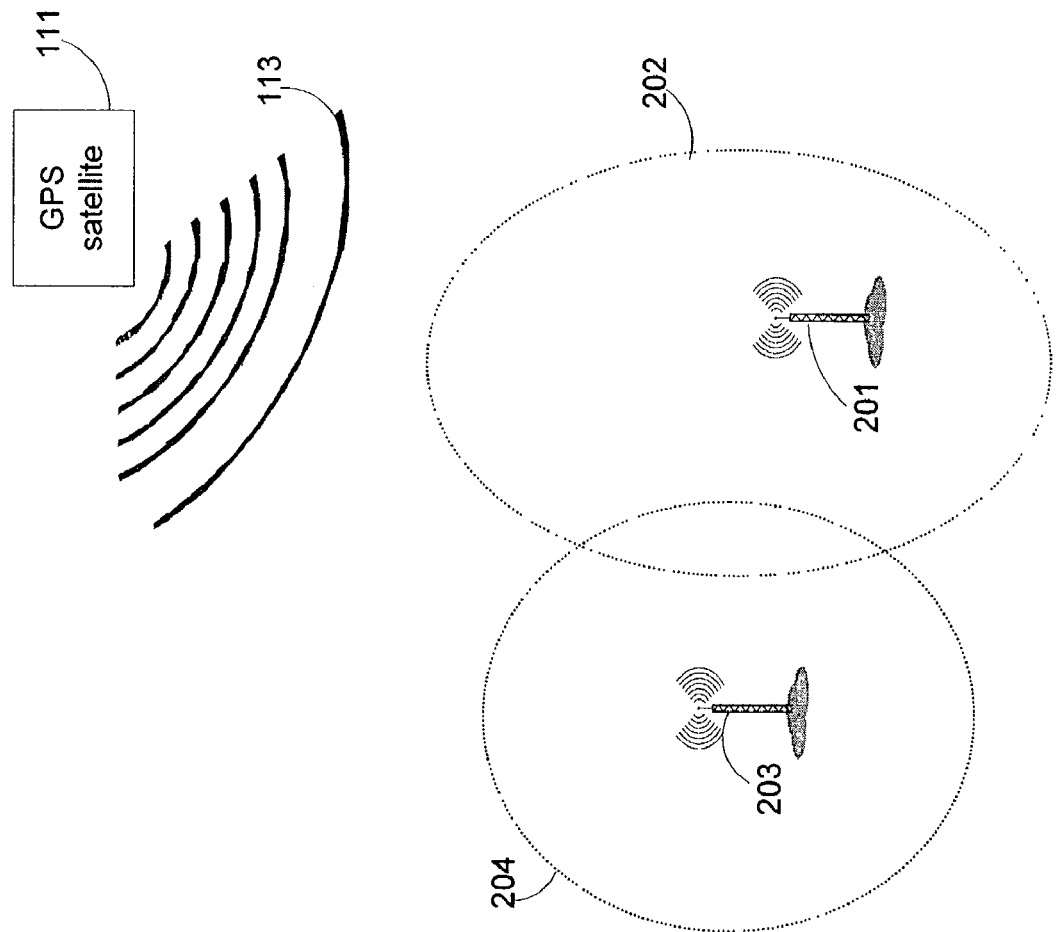
FIG. 2 shows a system of single frequency network (SFN) base stations that are synchronized by a global positioning system (GPS) reference system in accordance with prior art.
Figure 3:
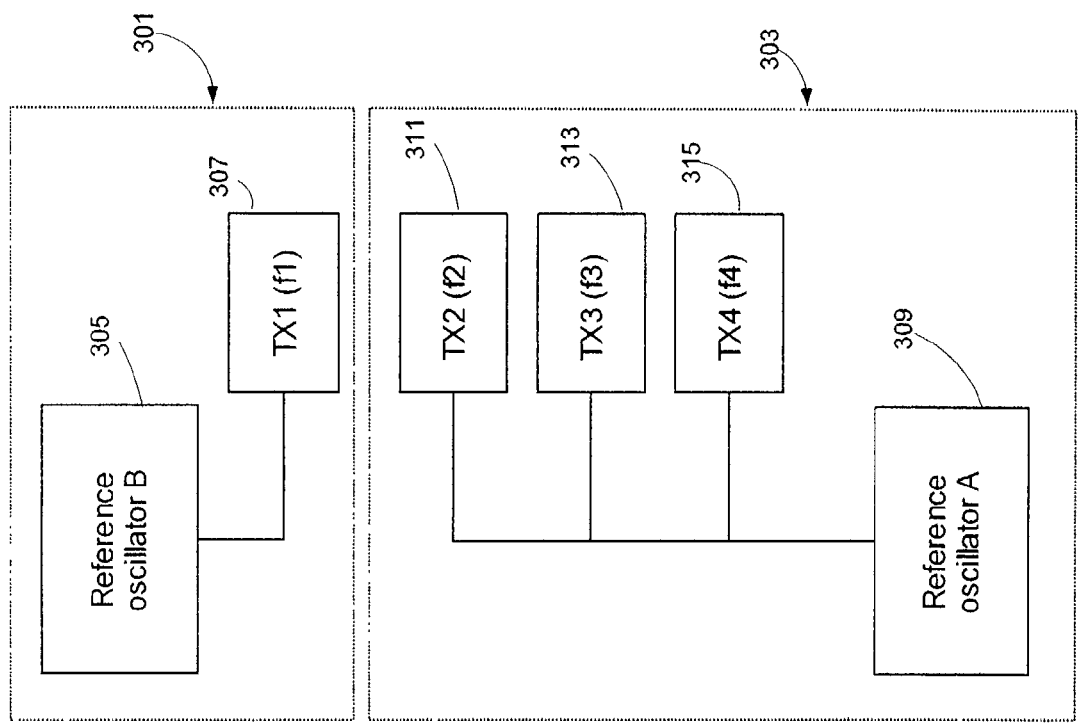
FIG. 3 shows two different radio networks that are synchronized by different reference oscillators in accordance with prior art.
Figure 4:
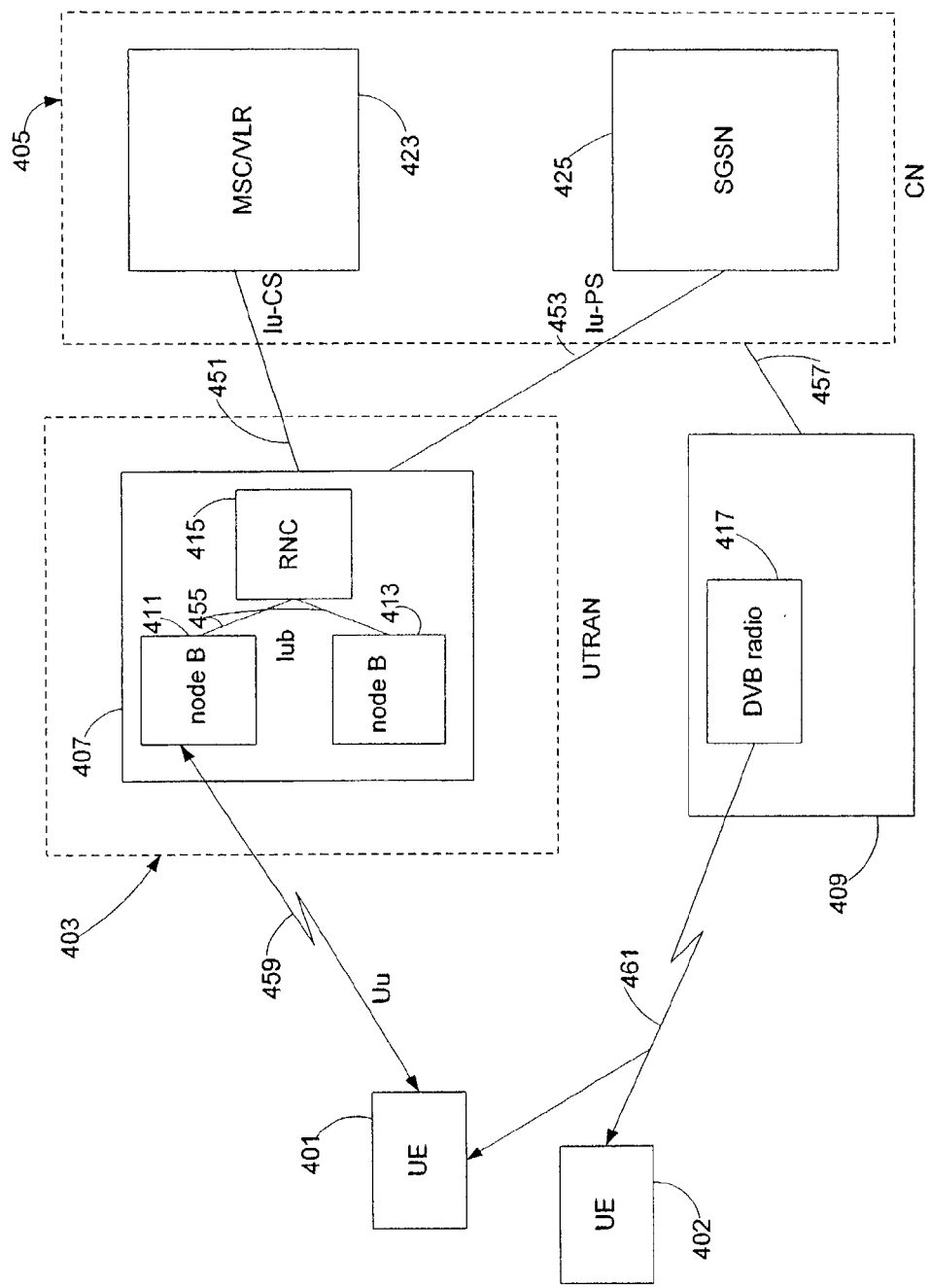
FIG. 4 shows a system architecture that integrates two different radio network systems in accordance with an embodiment of the invention.

FIG. 4 shows a system architecture of a wireless system 400 that integrates two different radio network systems in accordance with an embodiment of the invention. A radio network 403 comprises a UMTS (universal mobile telecommunication services) terrestrial radio access network (UT-RAN) and a radio network 409 comprises a terrestrial video broadcast network 409. Radio network 403 typically comprises a plurality of radio network subsystems (RNS), e.g. RNS 407. Radio network system 407 comprises node B 411 and node B 413. Node B 411 and 413 function as base stations in an UMTS architecture, providing radio communications to wireless terminals 401 and 402 over a radio channel 459 (as specified by a Uu interface 459). A radio network controller 415 owns and controls radio resources in its domain (e.g. node B 411 and 413). Radio network controller 415 is a service access point for all services that UTRAN 403 provides for a core network (CN) 405. Core network 405 comprises a mobile services switching center/visitor location register (MSCNLR) 423 and a serving GPRS (general packet radio service) support node (SGSN) 425. MSCNLR 423 is a telecommunication switch and a database that serves wireless terminals 401 and 402. The functionality of SGSN 425 is similar to that of MSC/VLR 423 but is typically used for packet switched services. The corresponding part of core network 405 is often referred as the packet switched domain. An Iu-CS interface 451 connects UTRAN 403 to MSC/VLR 423 in order to support circuit switched services. An Iu-PS interface 453 connects UTRAN 403 to SGSN 425 in order to support packet switched services.

Radio network 409 comprises a DVB radio 417 and provides digital content to wireless terminals 401 and 402 over a broadcast radio channel 461. A radio channel 461 is configured to provide a wide bandwidth capacity on the downlink (i.e. from DVB radio 407 to wireless terminals 401 and 402). Content delivery of the digital multimedia content is broadcasted or multicasted, in which the transmitted content to wireless terminals 401 and 402 is the same. Radio network 409 receives the digital multimedia content from core network 405 over interface 457 which may connect to an entity of core network 405 such as SGSN 425 or a gateway GPRS support node (GGSN) that is not shown or another connectivity gateway to receive content from the Internet (not shown in the FIG. 4).

In the embodiment, radio networks 403 and 409 utilize frequency spectra that are allocated for third generation mobile systems by the International Telecommunications Union (ITU). In Europe and in most of Asia, the IMT-2000 bands span 1920 MHz to 2170 MHz. In the United States, no new frequency spectrum has been allocated, although existing frequency spectrum (approximately 1850 MHz to 2000 GHz) for second generation mobile systems can be used. Wireless terminals 401 and 402 are informed about the frequency configuration through messages on the broadcast channel (BCCH) that are transmitted in accordance with the Uu interface. Messaging on the broadcast channel is discussed in more detail in the context of FIG. 8.

In the embodiment, radio networks 403 and 409 may utilize different radio transmission schemes (e.g. different modulation techniques) and, furthermore, may support different telecommunication services to wireless users. However, radio system 400 enables integrated operation of radio networks 403 and 409 as will be discussed in the context of FIGS. 5–8.

Figure 5:
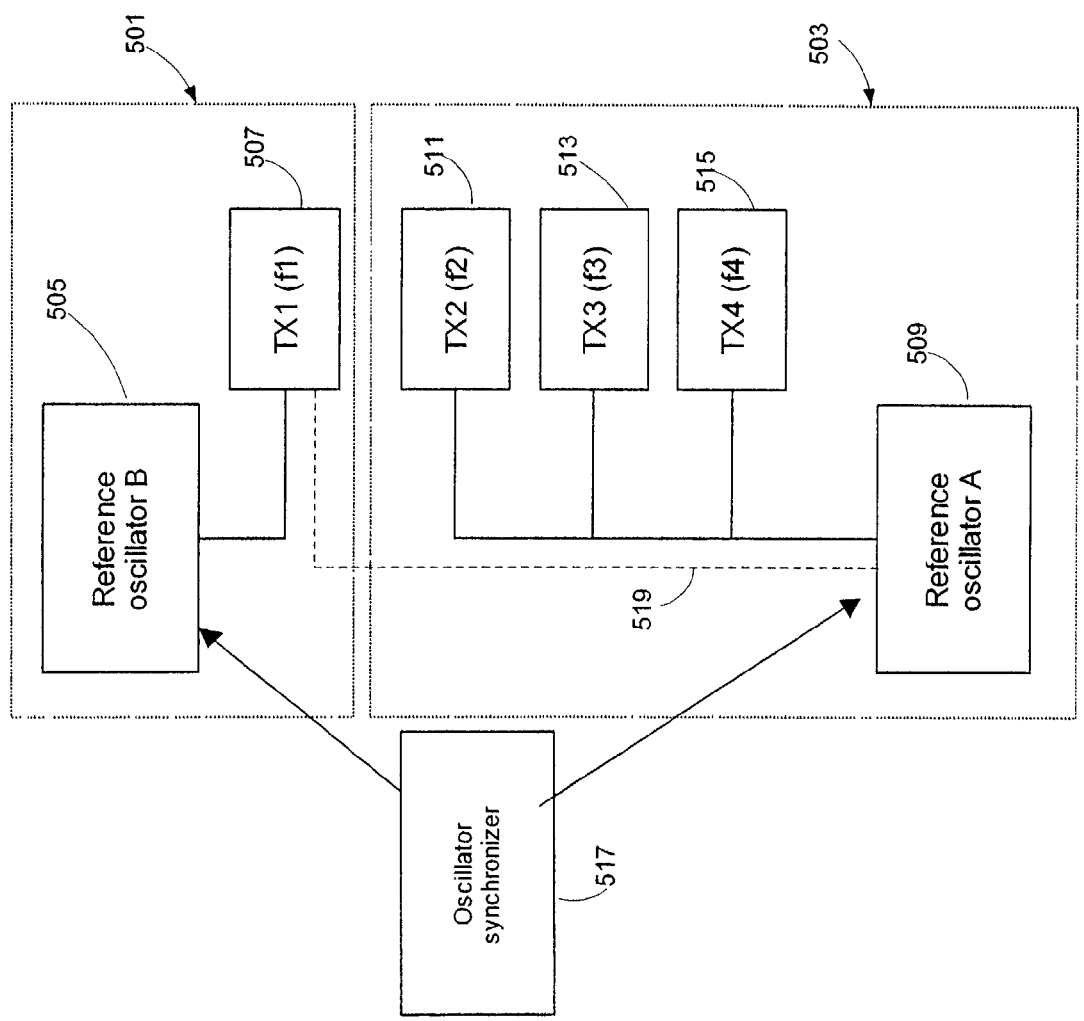
FIG. 5 shows a common oscillator synchronizer that synchronizes two radio network systems in accordance with an embodiment of the invention.

FIG. 5 shows a common oscillator synchronizer 517 that synchronizes radio networks systems 501 and 503 in accordance with an embodiment of the invention. In the embodiment, radio network 501 may correspond to DVB-T access point 409 and radio network 503 may correspond to node B 411 in FIG. 4. Radio network 501 comprises a reference oscillator 505 and a radio 507. Radio network 503 comprises a reference oscillator 509 and radios 511, 513, and 515. Reference oscillator 505 adjusts a center frequency f1 that is associated with radio 507. Reference oscillator 509 adjusts center frequencies f2, f3, and f4 that are associated with radios 511, 513, and 515, respectively. An oscillator synchronizer 517 synchronizes reference oscillators 505 and 509 in order to provide frequency and time stability that are required for the simultaneous operation of radio network 501 and radio network 503 that utilize IMT-2000 frequency spectrum. Oscillator synchronizer 517 may be implemented in a number of ways. For example, oscillator synchronizer 517 may comprise a very high performance standard manufactured by Tekelec Systemes (www.temex-telecom.com) as model Epsilon Clock 2S RB.

Without synchronizing oscillators 505 and 509, the center frequencies of radios 507, 511, 513, and 515 may drift in relationship with each other, possibly causing a performance (e.g. adjacent channel interference) of radio networks 501 and 503 not to meet performance specifications.

Even though FIG. 5 pictorially shows radio network 501 and radio network 503 in close proximity, as is the case if both radio networks 501 and 503 are co-located, variations of the embodiment may support configurations in which radio networks 501 and 503 are physically separated by a distance that is limited by time delays between oscillator synchronizer 517 and reference oscillator 509 and between oscillator synchronizer 517 and reference oscillator 505. Also, with the embodiment of the invention, oscillator synchronizer 517 may be physically associated with radio network 501 or radio network 503 or may be remotely associated with networks 501 and 503.

With a variation of the invention, reference oscillator 509 adjusts the center frequency of radio 507 through a connection 519, thus obviating the need for reference oscillator 505 and oscillator synchronizer 517. With other variations of the embodiment, reference oscillator 505 adjusts radios 511, 513, and 515 through a connection (not shown), thus obviating the need for reference oscillator 509.

Even though FIG. 5 shows two radio networks 501 and 503, other embodiments of the invention may support more than two radio networks. In such a case, oscillator synchronizer 517 may synchronize reference oscillators in each of the radio networks. Alternatively, a reference oscillator in one of the radio networks may adjust radios in the other radio networks.

Figure 6:
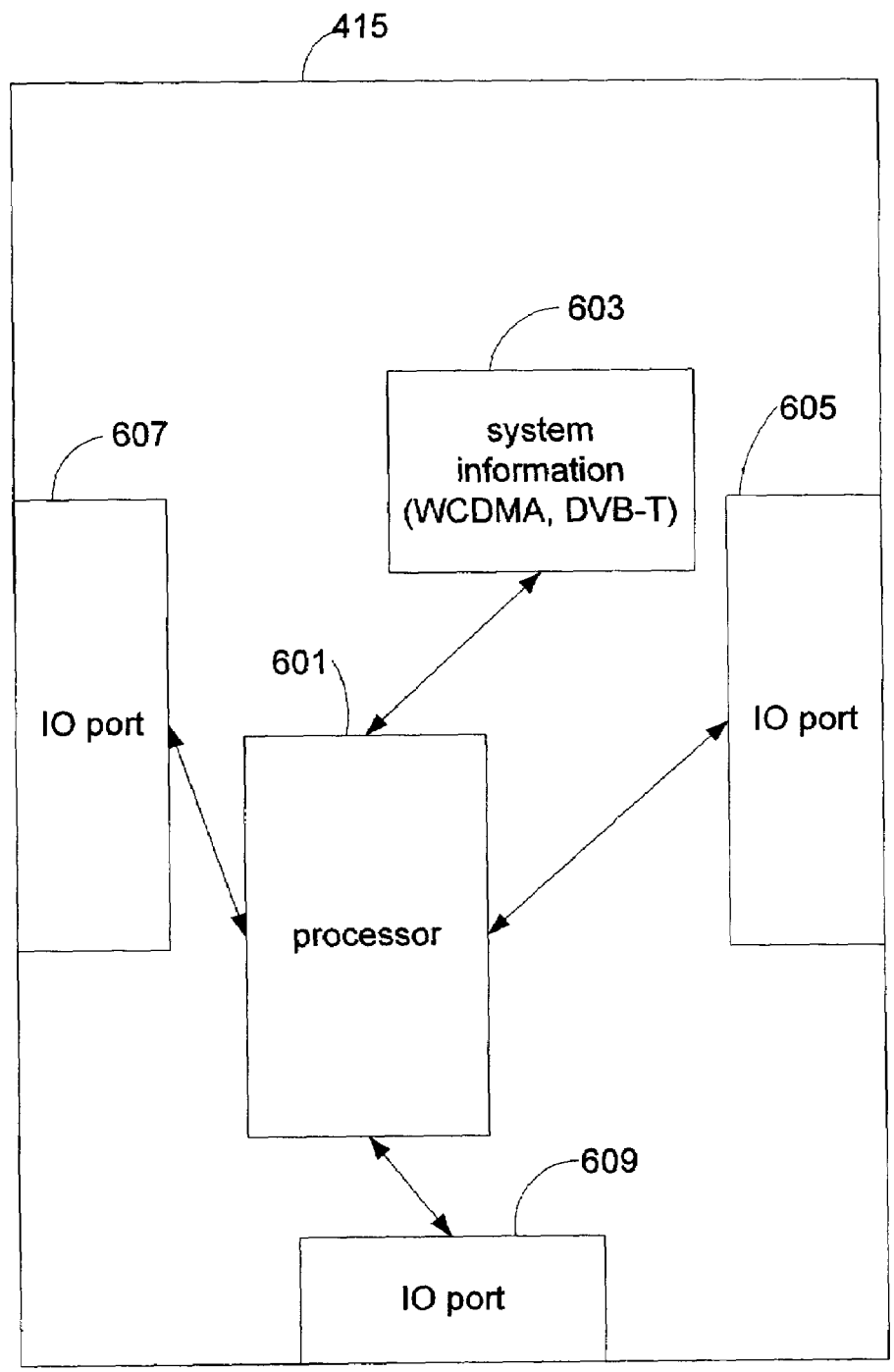
FIG. 6 shows an architecture of a radio network controller in accordance with an embodiment of the invention.

FIG. 6 shows an architecture of radio network controller 415 (as shown in FIG. 4) in accordance with an embodiment of the invention. Radio network controller 415 comprises a processor 601, a data structure 603 that contains system information about radio network 403 and radio network 409. The system information comprises center frequencies that are associated with radios 507, 511, 513, and 515. A data port 605 supports communications between radio network controller 415 and core network 405 in order to support Iu-CS interface 451 and Iu-PS interface 453. A data port 607 support communications between radio network controller 415 and node B 411 and 413. A data port 609 supports communications between radio network controller 415 and a control center (not shown) that enables the service provider to configure radio network controller 415, including system information that is contained in data structure 603.

Figure 7:
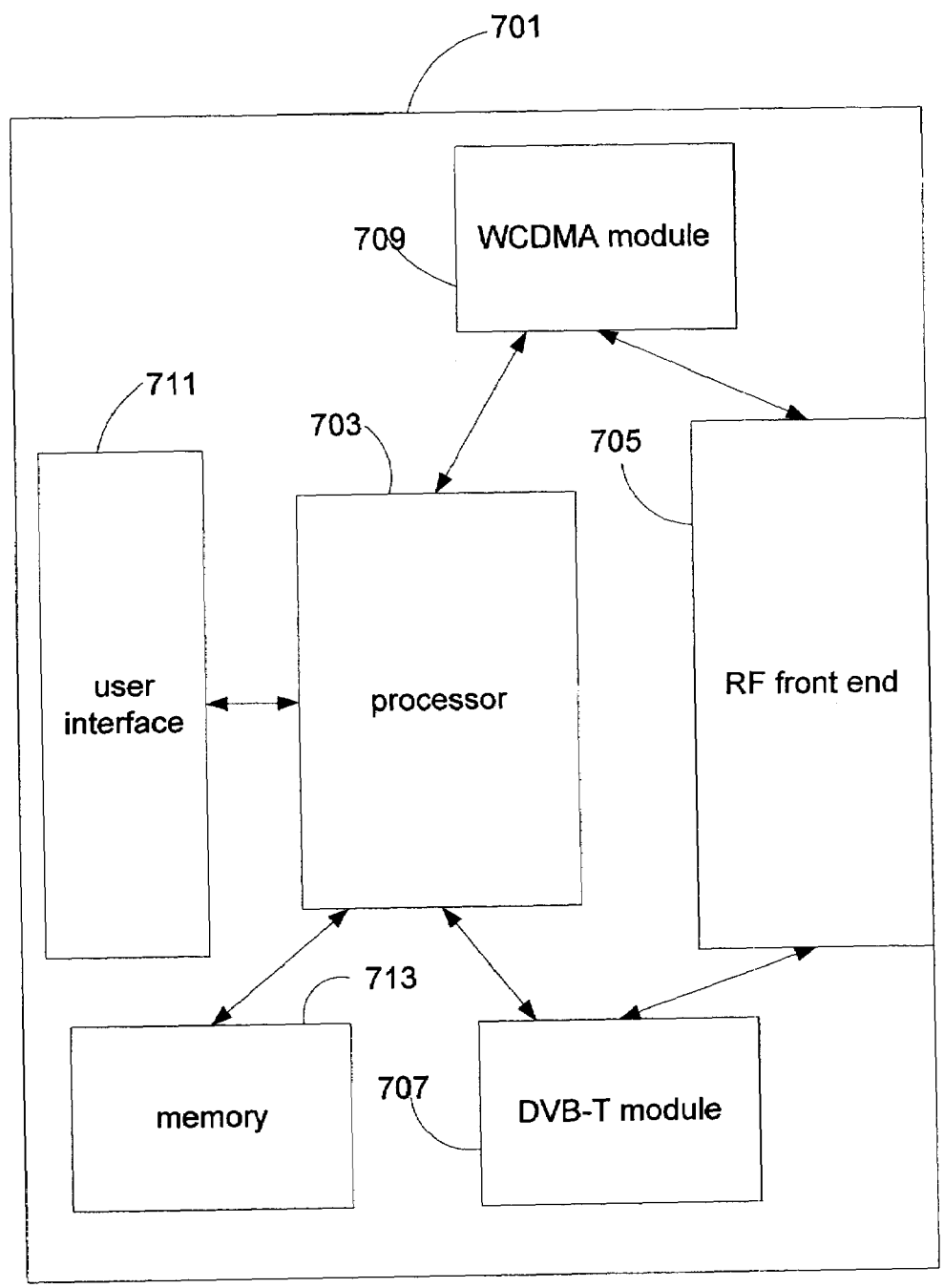
FIG. 7 shows an architecture of a wireless terminal in accordance with an embodiment of the invention.

FIG. 7 shows an architecture of wireless terminal 401 (as shown in FIG. 4) in accordance with an embodiment of the invention. Wireless terminal 701 comprises a processor 703, a radio frequency (RF) front end 705, a WCDMA module 709, a DVB-T module 707, a user interface 711, and a memory 713. RF front end 705 receives RF signals on radio channel 459 (associated with WCDMA) and radio channel 461 (associated with DVB-T). RF front end 705 filters, amplifies, and demodulates RF signals received on radio channel 459 (corresponding to WCDMA) and on broadcast radio channel 461 (corresponding to DVB-T) into corresponding intermediate signals. The WCDMA intermediate signal is passed to WCDMA module 709, and the DVB-T intermediate signal is passed to DVB-T module 707. WCDMA module 709 does further conversion of the WCDMA intermediate signal that may include message framing and error detection or correction, resulting in a WCDMA data signal that is processed by processor 703. DVB-T module 707 does further conversion of the DVB-T intermediate signal, resulting in a DVB-T data signal that is also processed by processor 703. In the embodiment, WCDMA module 709 and DVB-T module 707 are logically associated with a radio subsystem. In other embodiments of the invention, all or part of WCDMA module 709 and DVB-T module 707 may physically reside in a radio subsystem or may physically reside in processor 703.

Processor 703 processes the WCDMA data signal and the DVB-T data signal so that data outputs can be provided to a user on user interface 711. The DVB-T output signal may correspond to a video image on a video display while the WCDMA output signal may correspond to an audio signal that is played through an audio output device. The embodiment also enables processor 703 to store processed signals in memory 713 for access at subsequent time.

In the embodiment, processor 703 receives system information from node B 411 (as shown in FIG. 4) through RF front end 705 and WCDMA module 709. The system information may be contained in a system information message (as discussed in the context of FIG. 8). Processor 703 processes the system information and configures WCDMA module 709 and DVB-T module 707 in accordance with the system information.

Figure 8:
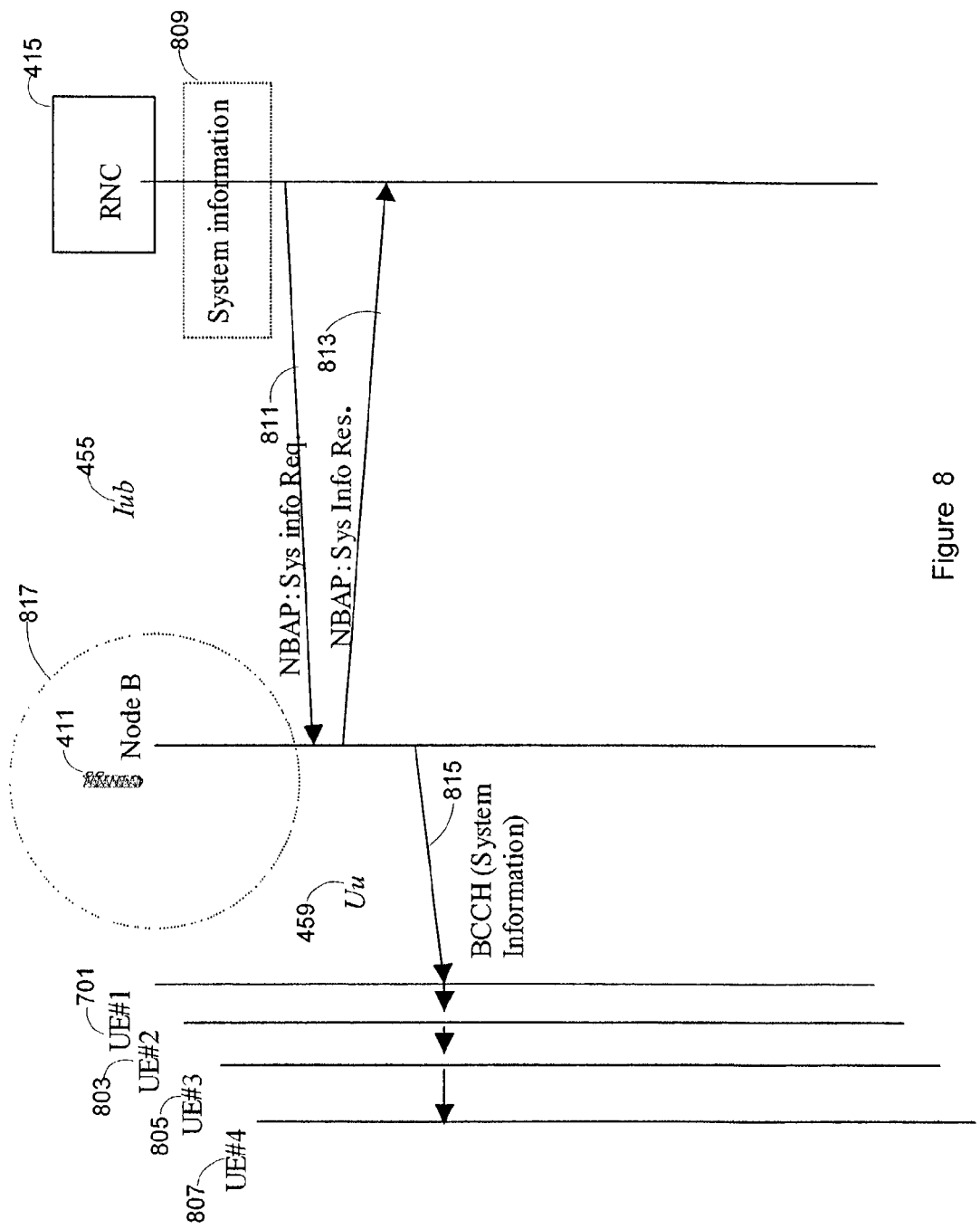
FIG. 8 shows a message scenario for a wireless system that integrates two radio network systems in accordance with an embodiment of the invention.

FIG. 8 shows a message scenario for a wireless system that integrates radio network 403 and radio network 409 in accordance with an embodiment of the invention. System information 809 is stored in data structure 603 of radio network controller 415. (System information 809 may originate from core network 405, radio network controller 415, or node B 411 and 413.) A system information update procedure is initiated by radio network controller 415 by a system information request message 811 being sent from radio network controller 415 to node B 411 over Iub interface 455. Node B 411 receives updated system information 809 comprising information about a current configuration of DVB-T access point 409. If the updated system information is successfully broadcasted on Uu interface 459, node B 411 returns a system information response message 813 to radio network controller 415.

In FIG. 8, node B 411 sends a system information message 815 to wireless terminals 701, 803, 805, and 807 on a broadcast channel (BCCH), which is a logical channel supported by Uu interface 459. System information message 815 carries system information blocks (SIBs), which group together system information elements of the same nature. System information message 815 may carry several system information blocks or only part of a system information block, depending on the size of the system information blocks that are transmitted. In the embodiment, information about DVB-T access point 409 (e.g. the center frequency of radio 511) is contained in one or more system information blocks that are transmitted to wireless terminals 701, 803, 805, and 807. The embodiment may use a system information block that is specified in $3^{rd}$ Generation Partnership Project (3GPP) specification TS 25.331 (RRC Protocol Specification).

Node B 411 may receive system information that comprises the center frequencies that are associated with radios 507, 511, 513, and 515 from radio network controller 415 as contained in data structure 603. With a variation of the embodiment, radio network 403 and radio network 409 may exchange configuration information (e.g. a number of configured radios, associated frequency bandwidth and guardband requirements) for a geographical region. One of the radio networks may utilize the configuration information in order to calculate a frequency allocation and instruct the other radio network of the frequency allocation. (The center frequency of each configured radio may be determined by adding the spectrum requirements of the configured radios and by minimizing interference among the configured radios. In general, the center frequencies are chosen to maintain a maximum frequency separation between adjacent spectra of the configured radios.)

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method of integrating a first radio network with a second radio network, wherein a first telecommunications service and a first center frequency are associated with the first radio network, wherein a second telecommunications service and second center frequency are associated with the second radio network, the method comprising the steps of:
   (a) receiving a first telecommunications service by adjusting the fist center frequency with a first reference oscillator of the first radio network;
   (b) receiving a second telecommunications service by adjusting the second center frequency with a second reference oscillator of the second radio network, wherein the second center frequency is different from the first center frequency and the first telecommunications service is different from the second telecommunications service; and
   (c) synchronizing the first reference oscillator and the second reference oscillator.

2. The method of claim 1, further comprising the step of:
   (d) broadcasting system information to a wireless terminal, wherein the system information comprises parameters about the first radio network and the second radio network.

3. The method of claim 2, further comprising the step of:
   (e) receiving the system information in order to broadcast the system information to the wireless terminal.

4. The method of claim 2, further comprising the step of:
   (e) determining the first center frequency and the second center frequency in accordance with a configuration of the first radio network and the second radio network.

5. The method of claim 4, wherein step (e) comprises the steps of:
   (i) exchanging configuration information between the first and second radio networks; and
   (ii) calculating the first and second center frequencies in accordance with the configuration information.

6. The method of claim 5, wherein the configuration information comprises frequency bandwidth requirements.

7. The method of claim 1, wherein the first radio network supports a technology selected from the group consisting of a wideband code division multiple access (CDMA)—frequency division duplex technology, a wideband CDMA—time division duplex technology, a multiple carrier—CDMA technology, and a global system for mobile communications (GSM) technology.

8. The method of claim 1, wherein the second radio network supports a broadband multicast service.

9. The method of claim 8, wherein the second radio network is in compliance with a terrestrial digital video broadcast (DVB-T) standard.

10. An integrated radio network, comprising:
    a first radio network associated with a first telecommunications service comprising:
    a first radio that is configured for a first center frequency; and
    a first reference oscillator that adjusts the first radio in accordance with the first center frequency;
    a second radio network associated with a second telecommunications service comprising:
    a second radio that is configured for a second center frequency; and
    a second reference oscillator that adjusts the second radio in accordance with the second center frequency, wherein the second center frequency is different front the first center frequency; and
    an oscillator synchronizer that synchronizes the first reference oscillator and the second reference oscillator.

11. The integrated radio network of claim 10, wherein the first radio network supports a cellular radio technology and the second radio network supports a terrestrial digital video broadcasting technology.

12. A method of integrating a cellular radio network with a digital video broadcast radio network, wherein a first telecommunications service and a first center frequency are associated with the cellular radio network, and wherein a second telecommunications service and second center frequency are associated with the digital video broadcast radio network, the method comprising the steps of:
    (a) adjusting the first center frequency with a first reference oscillator of the cellular radio network;

(b) adjusting the second center frequency with a second reference oscillator of the digital video broadcast radio network, (c) synchronizing the first reference oscillator and the second reference oscillator; and (d) broadcasting system information to a wireless terminal, wherein the system information comprises parameters about the cellular radio network and the digital video broadcast radio network.

* * * * *